Aug. 20, 1935.  W. G. HOELSCHER ET AL  2,012,084
HYDRAULIC GEAR SHIFTING MECHANISM
Filed Nov. 28, 1930   8 Sheets-Sheet 3
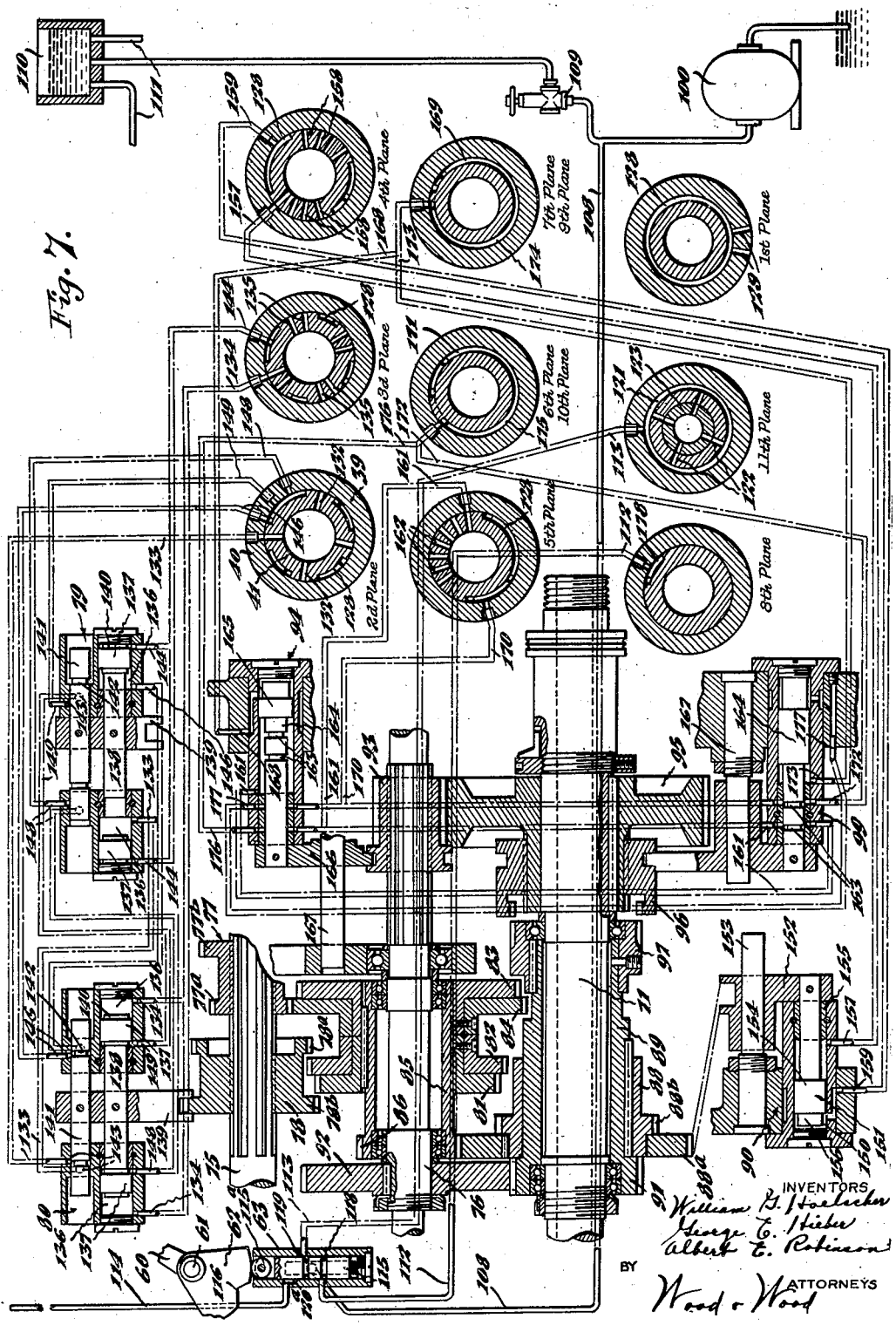

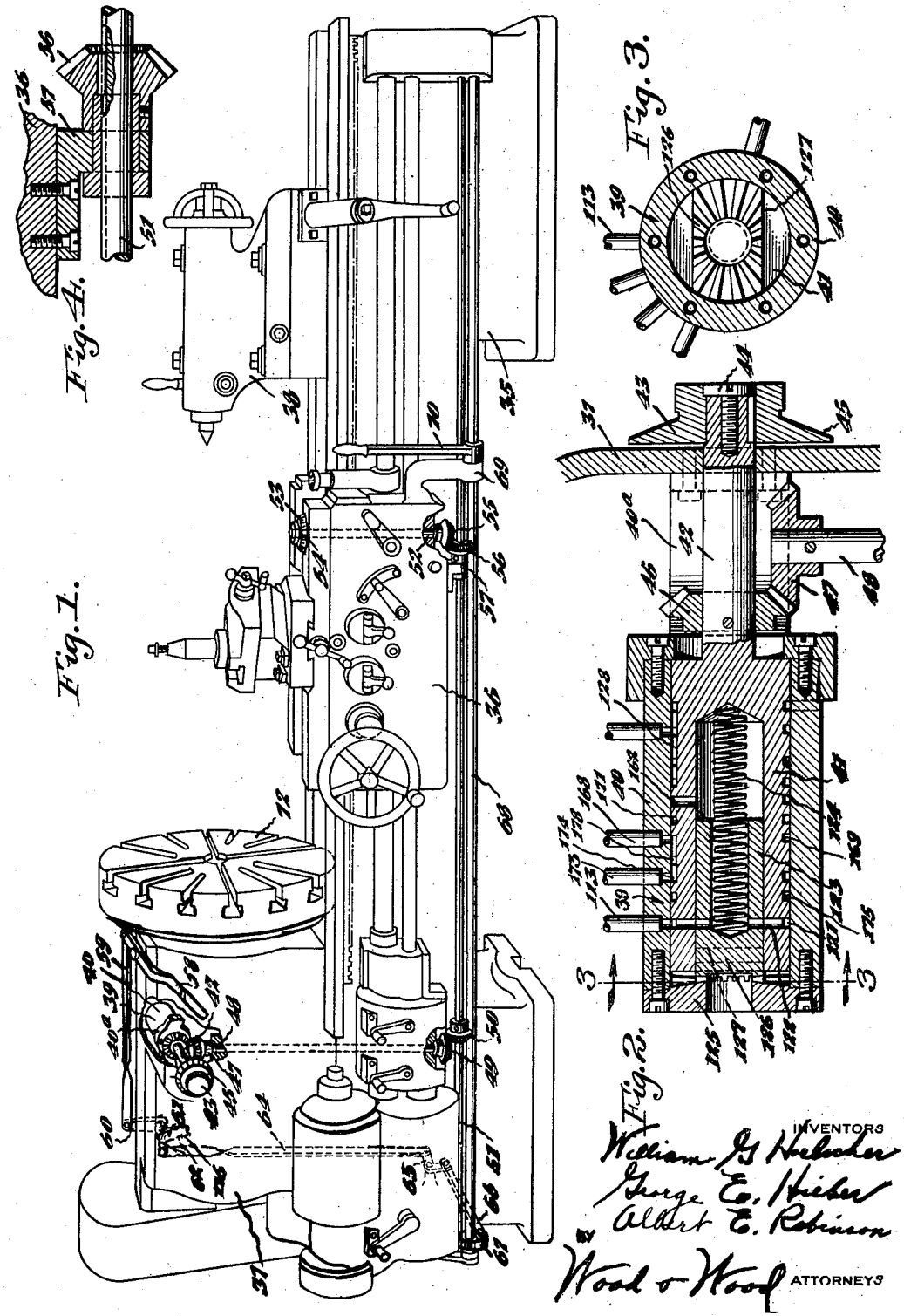

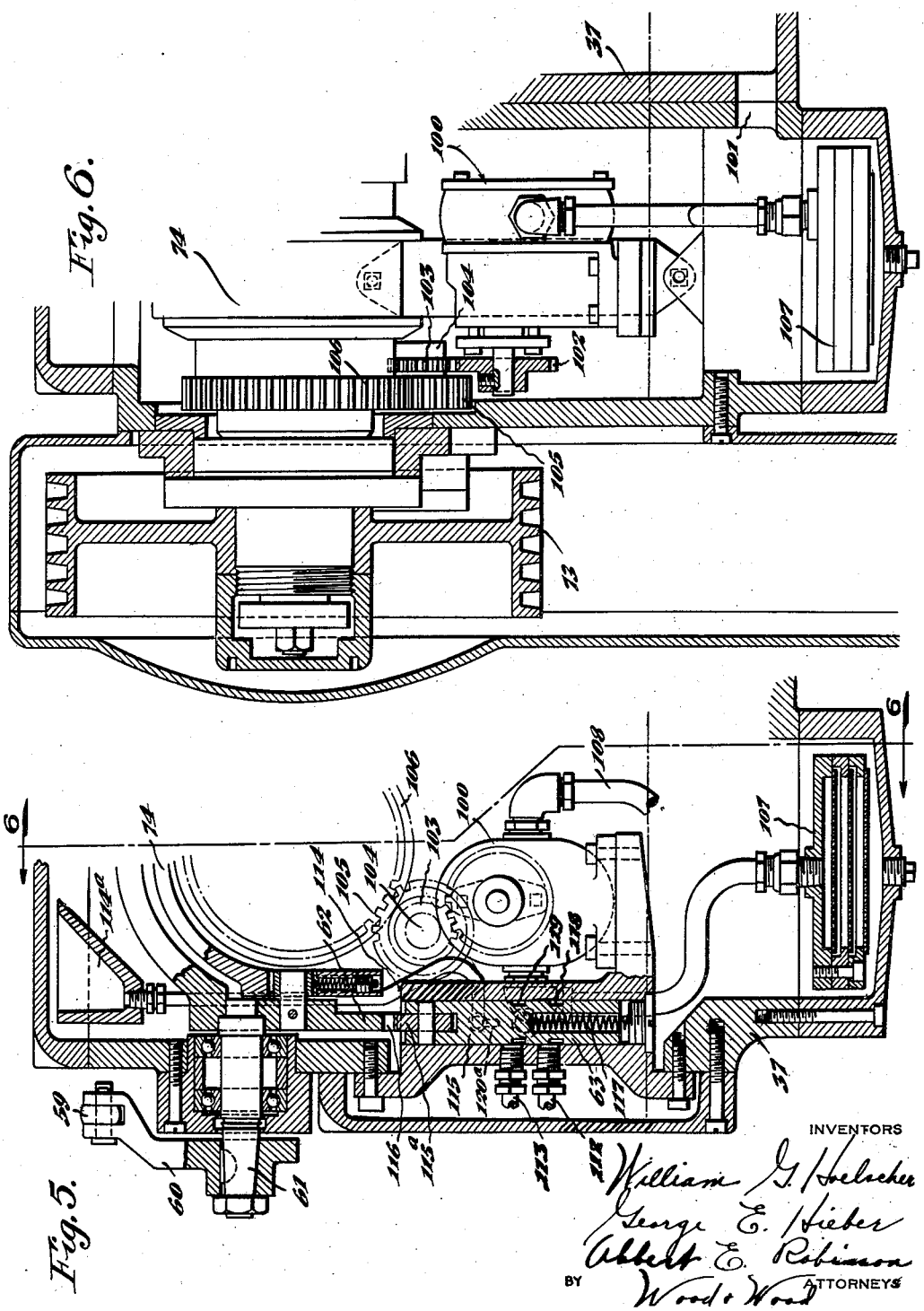

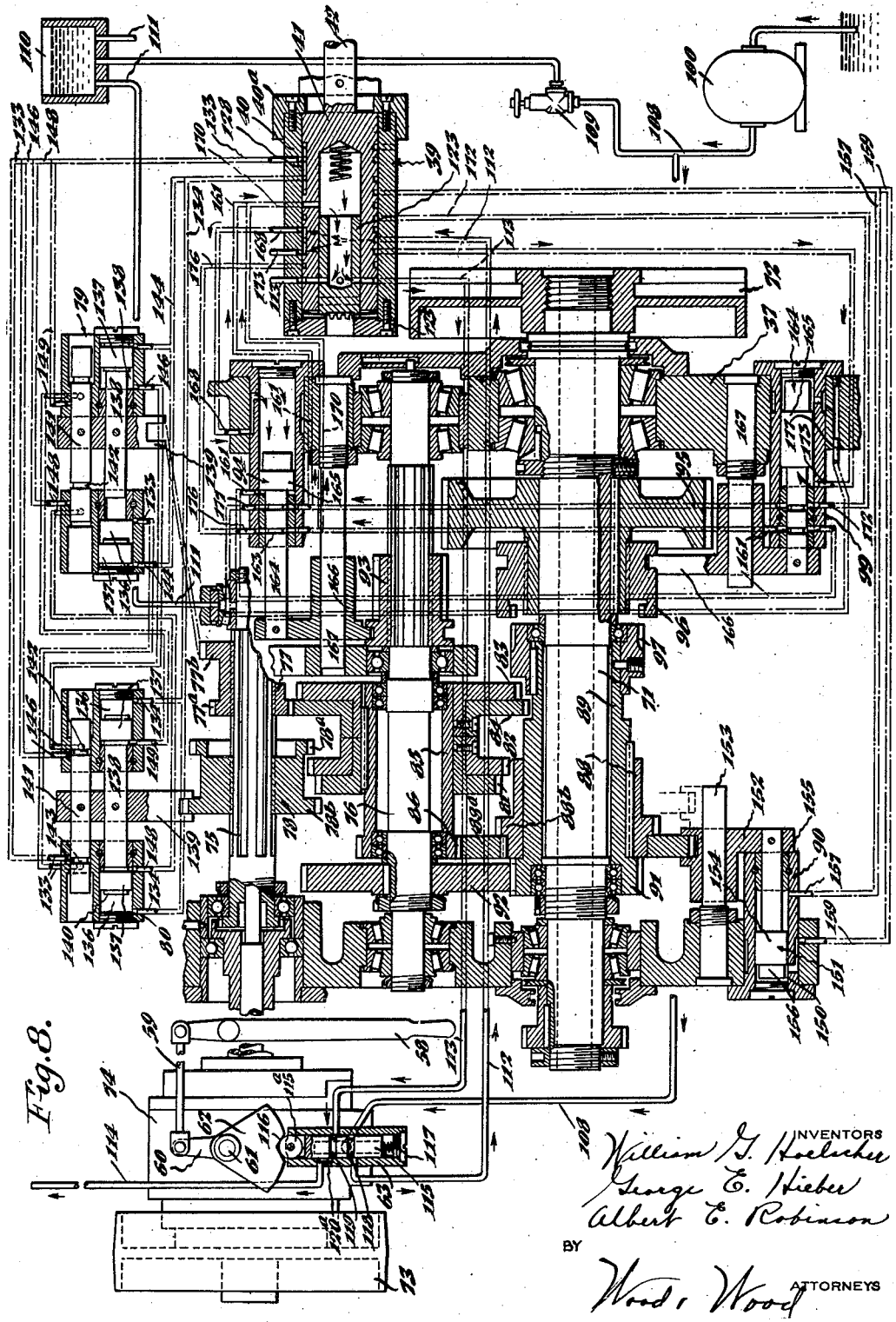

Aug. 20, 1935.  W. G. HOELSCHER ET AL  2,012,084
HYDRAULIC GEAR SHIFTING MECHANISM
Filed Nov. 28, 1930   8 Sheets-Sheet 5
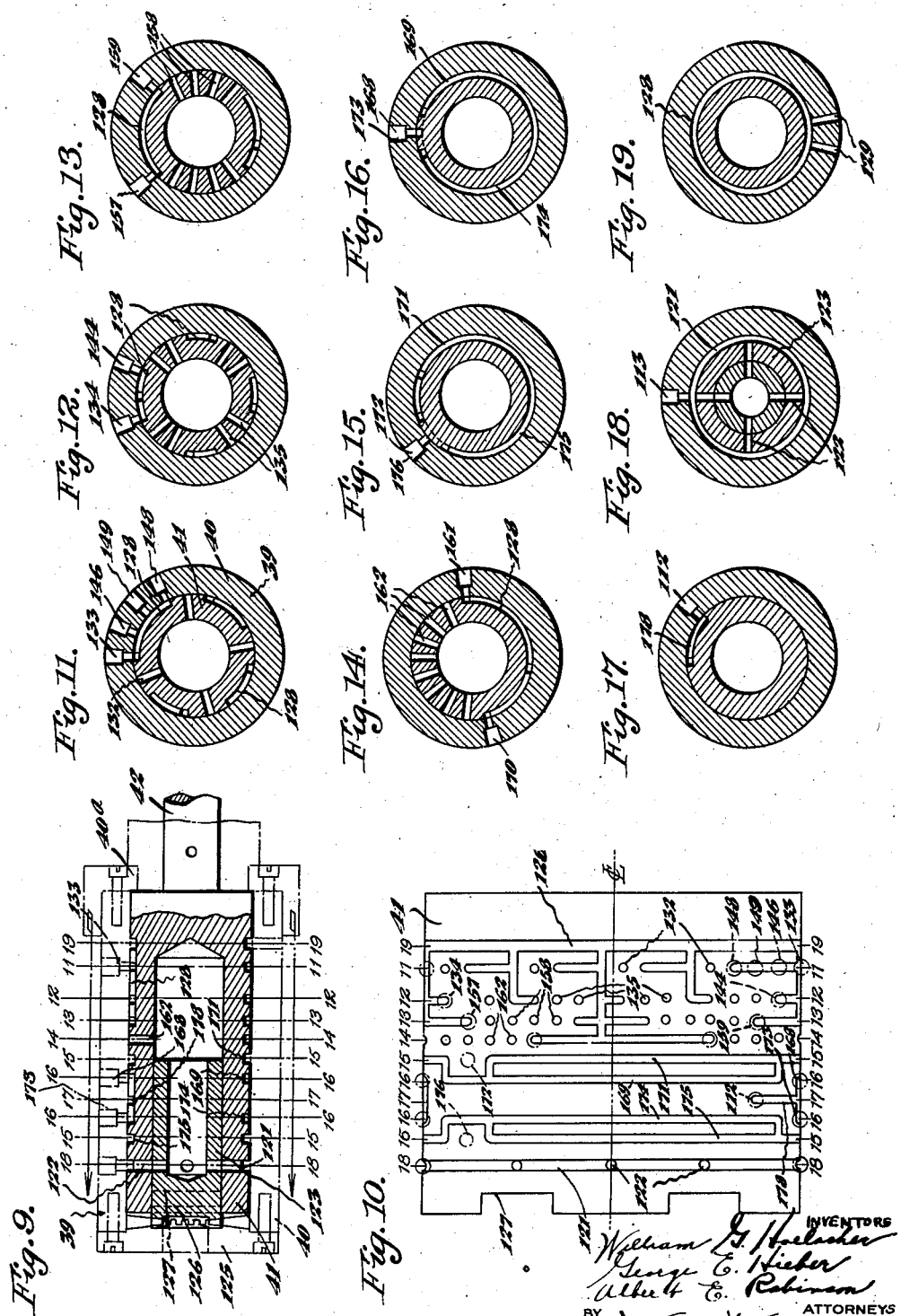

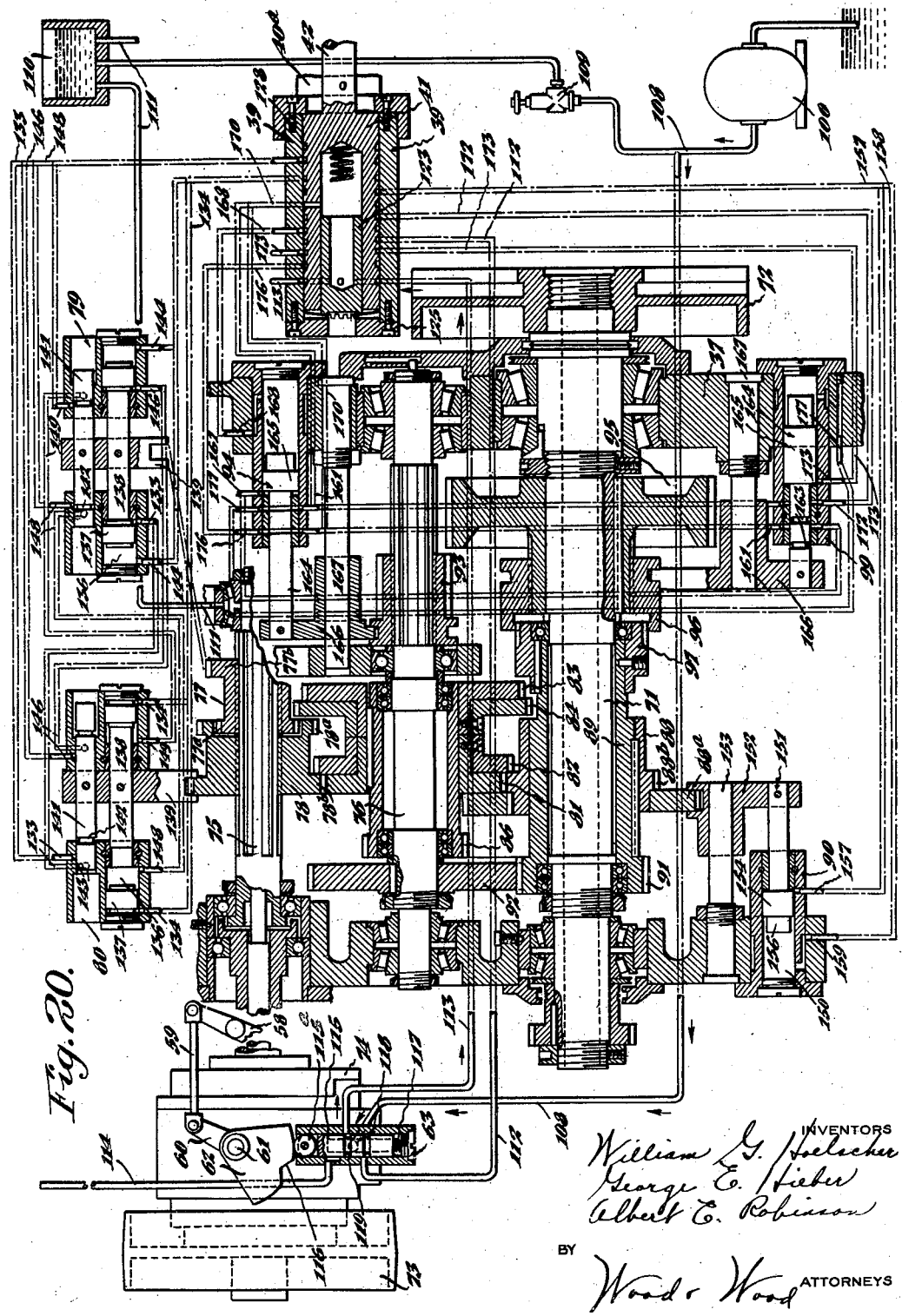

Aug. 20, 1935. W. G. HOELSCHER ET AL 2,012,084
HYDRAULIC GEAR SHIFTING MECHANISM
Filed Nov. 28, 1930 8 Sheets-Sheet 7
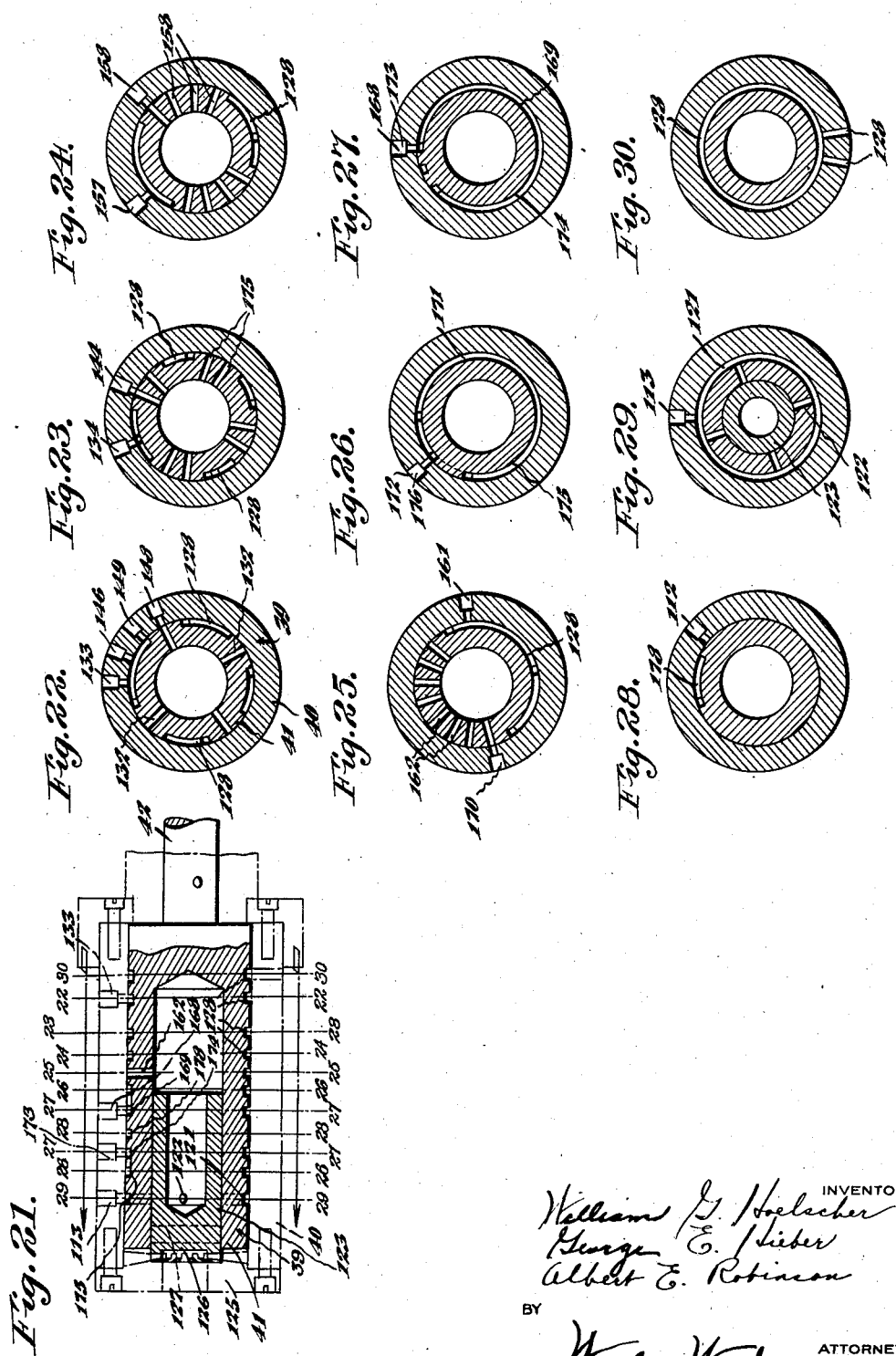

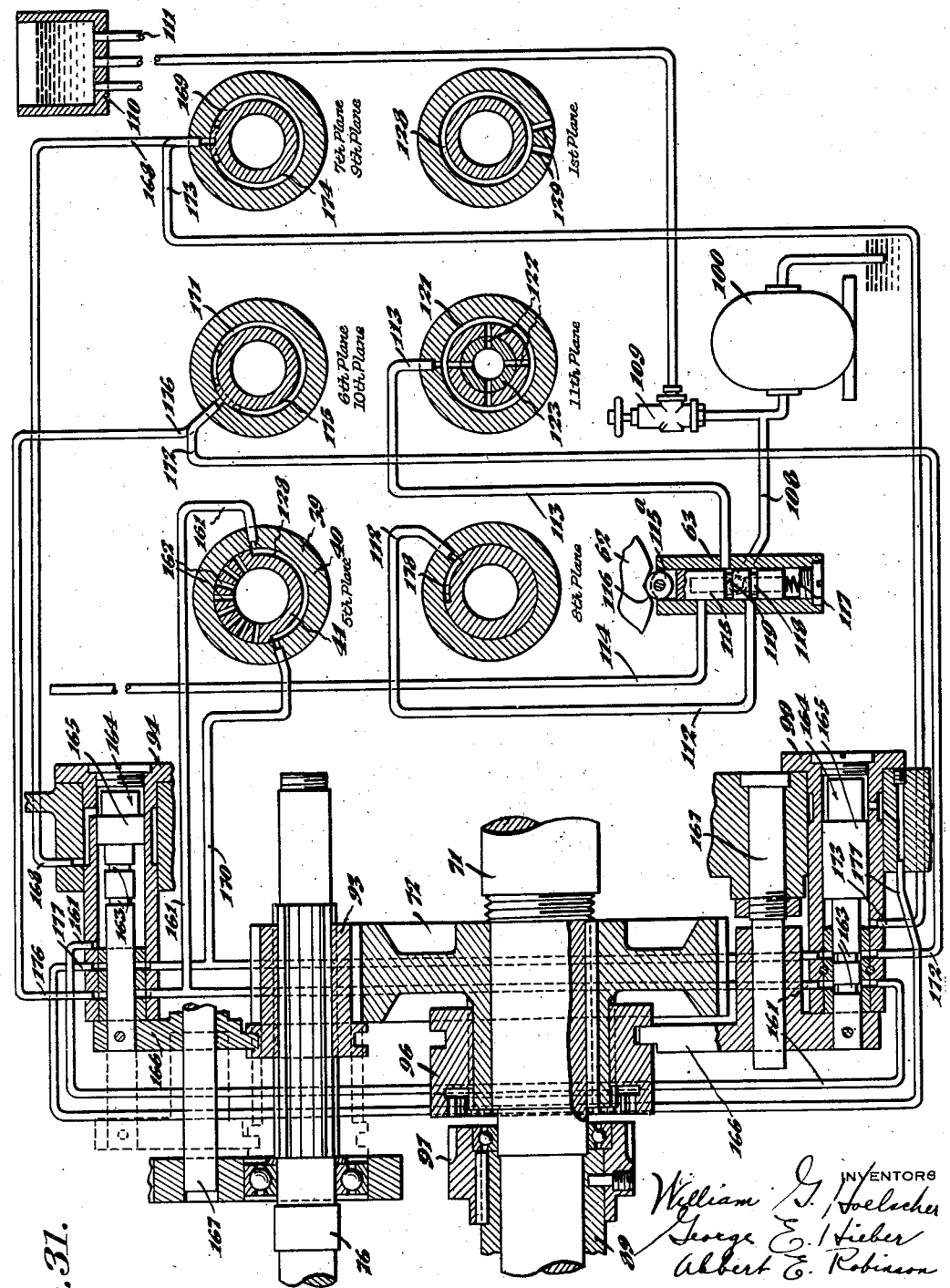

Patented Aug. 20, 1935

2,012,084

UNITED STATES PATENT OFFICE 2,012,084

HYDRAULIC GEAR SHIFTING MECHANISM

William G. Hoelscher, Norwood, and George E. Hieber and Albert E. Robinson, Cincinnati, Ohio, assignors, by mesne assignments, to The Cincinnati Milling Machine Company, Cincinnati, Ohio, a corporation of Ohio Application November 28, 1930, Serial No. 498,654

14 Claims. (Cl. 82—2)

This invention relates to lathes and is particularly directed to a fluid operated gear shifting mechanism for varying the speed of rotation of the spindle shaft of the lathe including the structure and arrangement of the control devices for selective hydraulic gear changing.

It is an object of this invention to provide a hydraulic mechanism for shifting the speed change gears in the headstock, which mechanism, including various gear sliding devices, a pump for creating the fluid pressure, and the control devices, is entirely located in the headstock; and wherein the gear shifting control for selectively varying the spindle speeds is conveniently and accurately operable by means of a manipulating indicator dial. It is furthermore an object to provide that the fluid pressure within the headstock which is circulated throughout the hydraulic system is constantly maintained at a degree of pressure suitable for shifting the gears by virtue of the power connection for the pump, wherein the pump is driven from a constantly rotating shaft, that is, one which is primarily moved by the power source for the lathe. It is also an object to provide that after the control dial is reset to the appropriate speed as indicated, the gear shift or speed change is effected automatically and immediately upon the power being connected. The speed changes thus accomplished are maintained without any opportunity for mishandling or improper gear shift sequence, since the application of the fluid pressure to the shifting devices and selector valve locks the selector valve against resetting while the spindle is being driven. The fluid pressure is applied slightly before the power is clutched so that the gears are first urged together whereupon the gear teeth are properly aligned for efficient intermesh as the power is first imparted.

In the conventional lathe practice, the operator usually stands beside the carriage from which point a more efficient control of the lathe is had for regulating the speed and length of traverse of the carriage and the depth of the cut. It has been usual, in lathe design, to include a dual power control for the spindle enabling the operator to connect the power either by means of the lever on the headstock or a lever on the carriage. It is consequently of importance that the spindle speed controls also be accessible from either the headstock or the carriage. Therefore, it is another object of this invention to provide a dual control system for effecting the gear changes, which control system includes a manipulating indicator dial located on the headstock and a similar dial located on the carriage, identical movement or positioning of either dial accomplishing the same result of gear shift within the headstock.

A disadvantage which has been present in lathe construction and which has resulted in considerable labor and inconvenience on the part of the operator has been the fact that the face plate mounted on the spindle, which element must be rotated by hand during the processes of fastening the parts to be meshed thereto, has been incapable of total disconnection from the gearing, wherefor rotation thereof has compelled a back rotation of all the gears in mesh at the particular time. It is, therefore, an object of this invention to provide a transmission, which is hydraulically shifted, including a free spindle position whereby in addition to the speed changes, such as sixteen in the average lathe, for associating therewith a seventeenth position in which the gears directly driving the spindle are disconnected or unmeshed when it is desired to manipulate the face plate. It will readily be seen that this free spindle position is of extreme importance in any type of transmission, and is of special importance in the instance of hydraulic shifting wherefor the hydraulic control accomplishing this positioning of the gear train includes devices of particular construction and in novel arrangement.

It is another object of this invention to provide fluid pressure gear shifting means including a primary or main control associated with the power control clutch, terminating the fluid pressure flow to the gear shift selector valve coincidentally with the unclutching of the power to the gears, whereby the selector valve may be reset for the desired speed change. The one duration from the foregoing operation occurs at the seventeenth or free spindle position, it being provided at this position that the fluid pressure flow is admitted through the selector valve for disengaging the appropriate gears.

Another object is to provide a fluid pressure means associated with the transmission of a lathe for changing the gears which also combines the lubrication system for oiling the bearings of the transmission, the lubrication system making use of the overflow or surplus fluid pumped from the motor and overflowing or being relieved from the pressure head necessary to maintain the selected gears in mesh.

Another object is to provide a hydraulic gear shifting system of the nature described in which the fluid used for shifting and oiling purposes is maintained in constant pressure supply to the selective gear shifting control valve and to the bearings and is returned or overflows into the headstock casing to a reservoir where it is repumped for the same purposes and to include in the same arrangement a stand pipe for maintaining a head pressure when the pump is stopped and a lubricating oil tank above the level of the bearings for a reserve supply when the pumping has ceased.

The conventional spindle shaft extends longitudinally between the walls of the headstock of the lathe and carries a face plate or work point on an end extended beyond the confines of the headstock. The shaft is journalled in bearings in the walls of the headstock casing and the power has been applied at various points along the spindle shaft length within the headstock.

The present invention further relates to an improvement in the application of the drive to the spindle shaft and has for another object the provision of a power transmission which imparts the drive to the spindle at points as nearly adjacent the bearings thereof as possible. The purpose of this construction is to eliminate springing of the spindle shaft under the driving impulses such as would occur if the drive were imparted exactly intermediate of the shaft length or at a distance from the bearings. This springing results in disalignment of the work since the face plate or work point is thrown out of axial alignment with the tail-stock point, its axial position varying considerably as the shaft rotates. With the driving gears on the spindle mounted close up to the bearings, this disadvantage is eliminated and the axial alignment of the spindle shaft is maintained despite heavy driving pressures.

Other objects and certain advantages relate to the construction of the selector valve for controlling the fluid flow from a common point of head pressure to the respective shifting devices as well as the construction of the shifting devices and appropriate interlocks for preventing improper intermeshing of gears, which objects together with certain other objects and advantages will be more fully apparent from the description of the accompanying drawings, in which:

Figure 1 is a general perspective view showing an entire lathe and illustrating the respective dual arrangements of the power control devices and the speed change control devices as well as the association of respective ones of these arrangements for speed change and power control either from the carriage or the headstock.

Figure 2 is a longitudinal sectional view taken through the selector valve, illustrating its mounting relative to the headstock casing and showing the dual connection to its rotatable element for operating the same.

Figure 3 is a sectional view taken on line 3—3, Figure 2, detailing the hydraulically operated detent lock for positively maintaining the selector valve in set position when the power is connected.

Figure 4 is a fragmentary sectional view illustrating the mounting of the gear rotatably connecting the manipulating knob on the carriage to the longitudinally disposed splined shaft.

Figure 5 is a fragmentary sectional view taken transversely of the headstock at the point of the clutch for illustrating the relation of the main control valve and the fluid pressure pump relative to the clutch and its operating mechanism and a constantly rotating gear on the main power shaft of the headstock.

Figure 6 is a fragmentary view taken on line 6—6, Figure 5, further detailing the relation of the fluid pressure pump to the main power shaft and also showing the power pulley for the headstock gearing.

Figure 7 is a diagrammatic view illustrating the complete hydraulic system and showing the various gear shifting devices and the selector valve in set position for operating the spindle at lowest speed, a series of transverse sections of the selector valve being included for illustrating the conduit connections.

Figure 8 is a diagrammatic view taken similar to Figure 7, but showing the clutch in neutral position and the selector valve and various gear shifting devices of the hydraulic system set for the neutral, seventeenth, or free spindle position.

Figure 9 is an enlarged longitudinal sectional view of the rotatable element of the selector valve.

Figure 10 is a developed view of the peripheral surface of the rotatable valve element, illustrating in detail the various grooves therein and the supply ports entering the interior of the rotatable valve element.

Figures 11 to 19 inclusive are transverse sectional views taken on the respectively indicated lines of Figure 9, for illustrating the relation of the grooves and ports of the valve to the respective conduits extending to the shifting devices when the selector valve is in free spindle position.

Figure 20 is a diagrammatic view illustrating the complete hydraulic gear shifting system in relation to the spindle operating transmission of the lathe, this view being similar to Figures 7 and 8, but showing the apparatus and transmission in position for imparting high speed to the spindle shaft.

Figure 21 is a longitudinal sectional view, enlarged out of Figure 20, of the rotatable element of the selector valve.

Figures 22 to 30, inclusive, are transverse sectional views taken on the respectively indicated lines of Figure 21, for illustrating the relation of the grooves and ports of the valve to the respective conduits extending to the shifting devices when the selector valve is in high speed position.

Figure 31 is a diagrammatic view of a portion of the transmission, including various sectional views of the selector valve for showing in detail the hydraulic shifting apparatus about to be shifted to neutral or free spindle position after the transmission has been at low speed, the view being provided for the purpose of illustrating in detail the hydraulic interlock and the particular gears affected by the selector valve in free spindle position.

The present invention, described in general and as applied to the spindle speed change gears of a lathe, discloses the entire hydraulic gear shifting apparatus including the fluid pressure supply means compactly assembled within the headstock of the lathe. The selector valve for directing the pressure flow to the selected gear shifting device is also located within the headstock but is manipulated from the exterior thereof at two points by means of duplicate speed control devices. One of these is located on the headstock and the other is mounted on the carriage. The ultimate control devices are in the form of dials suitably indexed to indicate the various speeds applied to the spindle through the dial settings. The present arrangement of dials or control devices for speed change includes a dial adjacent each power control lever for the drive to the headstock gears, there being a lever headstock and one on the carriage, these levers connected to the clutch for arbitrary use as convenient for the operator.

These levers which operate the clutch connecting the power pulley to the transmission also operate a main control valve in the headstock which admits the fluid under pressure from the pump to the selector valve when the clutch is in. When the clutch is out or disconnected, the control valve is effective for admitting the fluid pressure flow from the pump to the selector valve, in one position of the selector valve, for an entirely different purpose from that of the gear shift effecting connection of the flow when the clutch is connected, namely the general unmeshing of all the gears connecting the power directly to the spindle and the accomplishment of the free spindle or neutral position. The selector valve is shiftable only at the time when the clutch is disconnected and is, therefore, capable of setting, at this time, for effecting the neutralizing shifts of the various shifting devices associated with the gears of the train.

The control valve also admits fluid from the selector valve to the stand-pipe when the clutch is disconnected for permitting relief in the various passageways and central bore of the selector valve, any overflow of oil from the stand-pipe taking place into the casing reservoir. The exhaust from the various shifting devices during reversal of pistons takes place directly from the selector valve through an outlet port emptying into the lower regions of the headstock casing. Therefore, the flow of pumped fluid under pressure to the selector valve may be accomplished through either position of the control valve, as determined by clutch position in the instances of clutched position for gear change and in the instance of unclutched position for total spindle gear disconnection or free spindle position.

The selector valve includes a hydraulically operated locking means for preventing shifting of the selector valve when the transmission is being driven; in other words, the fluid pressure being operative upon the locking means when the clutch is in. The selector valve includes a valve casing and a rotatable valve element which is manipulated or rotated by hand. The movable valve element includes an intricate arrangement of grooves in its periphery registering with various pipe conduits, connecting the various shifting devices to the casing, for the accomplishment of the various shifted positions of the gear train. The fluid pressure is thus manually controlled from the point of the selector valve for introduction to those shifting devices effecting the desired gear change and for appropriate exhaust. The pipe connections from the selector valve to the shifting devices may function as feed lines, discharge lines, or may be shut off at the valve to trap the fluid therein and lock the particular devices previously shifted. In those instances, in the particular transmission disclosed, where two gear clusters are independently shiftable on the same shaft, a hydraulic interlock is provided between the shifting devices, operating respective gear clusters, being in the nature of control valves reversely functioning for controlling the flow through one shifting device to the other.

Referring to Figure 1 of the drawings, the lathe bed is indicated at 35, the carriage at 36, the headstock at 37, and tailstock at 38. The carriage, as is conventional in lathe structure, is movable on the longitudinal slideways of the bed. The selector valve 39 for controlling the application of hydraulics to the gear shifting devices is secured within the headstock upon a side wall thereof (see Figure 2). The selector valve is of a rotatable type including (see Figure 2) a stationary casing 40 which is secured to the wall and a rotatable element 41 contained within the casing having a stud or shaft portion 42 extending through the headstock casing wall to the exterior thereof and carrying a knob 43 keyed thereon and held in place against axial displacement by means of a screw 44. This knob includes a dial 45 graduated to represent seventeen positions, in the present instance, the graduations on the dial adapted to indicate the particular position of the gears as determined by registration of one of the graduations with a mark on the headstock wall.

A second means is provided for rotating the element 41 of the valve from the carriage. For this purpose a bevel gear 46 is secured on the shaft extension 42 of the rotatable element between the knob and the element proper. This gear 46 is in mesh with another bevelled gear 47 of the same size secured to the upper end of a vertical shaft 48 supported in and extending downwardly (in this instance) through the headstock and lathe bed. Another bevel gear 49 is secured on the lower end of this vertical shaft and is in mesh with another bevel gear 50 fixed to a splined shaft 51, disposed longitudinally of the lathe bed and journalled in brackets thereof, the latter gear 50 being pinned to the shaft against rotative and longitudinal displacement.

The carriage 36 has a vertical shaft 52 rotatively journalled therein and a knob 53 including a dial 54 is mounted on the upper end of the shaft 52 and is disposed for movement relative to a mark on the top surface of the carriage. This knob is identical to the knob on the headstock. A bevel gear 55 is secured on the lower end of the vertical shaft 52 in the carriage, this gear 55 being in mesh with a bevel gear 56 slidably mounted on the splined shaft 51 and has its sleeve or hub extension rotatively journalled in a depending bearing extension 57 of the carriage. Therefore, as the carriage is traversed, the gear in splined connection with the shaft slides along the same and is capable of transmitting rotative movement to the shaft at any position of the carriage for rotating the valve element through the aforesaid connection for accomplishing the same settings of the dial and appropriate gear shifts as those accomplished by manipulation of the knob on the headstock. It is, therefore, possible for the operator to change spindle speeds either from position at the carriage or at the headstock.

Each of the selecting knobs 43, 53, is definitely associated with a power control lever. As one means for this purpose a fulcrumed power control lever 58 is mounted on the headstock, the handle end of this power control lever extending to a point adjacent the speed change knob 43 on the headstock.

The short arm of the fulcrumed lever 58 is connected, by means of a link 59, to one arm of the bell crank lever 60 pinned to the clutch operating shaft 61, journalled in the walls of the headstock. It will also be observed at this point that the cam 62 for operating the main control valve 63 of the hydraulic gear shifting system is also pinned to this clutch operating shaft 61 (see diagrammatic views and Figure 1). The other arm of the bell crank lever 60 is connected by means of a downwardly extending link 64 to one arm of a bell crank lever 65 pivoted on the lathe bed, the other arm of the last mentioned bell crank lever being connected by means of a third link 66 to the swinging end of an arm 67 pinned to a splined shaft 68 which extends longitudinally of the lathe bed, adjacent and parallel to the speed change control shaft 51.

The power control shaft is journalled at the respective ends of the lathe bed in the same manner as the shaft 51 and traverses a bracket 69 of the carriage this bracket carrying a second power control lever 70 rotatively journalled therein and extending upwardly to a point adjacent the knob 53 on the top of the carriage.

The lever 70, including its sleeve or hub extension, is slidably mounted on the splined longitudinally disposed shaft 68 for the purpose of imparting rotative movement to the shaft when the lever is moved, and at the same time permitting longitudinal movement of the carriage carrying the lever along the shaft. The lever 58 and knob 43 and the lever 70 and knob 53, therefore, are conveniently accessibly associated for control of the power and operation of the selector valve for speed change either from the carriage or the headstock.

The hydraulic system has been illustrated in diagrammatic or lay-out form. It is to be understood, however, that it is preferable to mount all of the mechanisms for shifting the gears, including the power, within the headstock. Sufficient portions of the headstock casing and its contained parts and gears are disclosed in the diagrammatic views in combination with the fluid operated gear shifting apparatus to disclose this feature of compact assembly.

The gear transmission, to which the hydraulic shifting means has been applied in the present instance, accomplishes the various speed changes for the spindle shaft 71 of the lathe. The face plate mounted on the spindle shaft 71 is indicated at 72 (see Figure 1 and diagrammatic views) and the power transmitted to this face plate through the various gears and shafts of the transmission is provided through a motor driven pulley indicated at 73, reversal and disconnection of the pulley from the transmission being accomplished by means of the conventional clutch generally indicated at 74.

In Figure 8 of the drawings, the entire hydraulic mechanism and transmission are shown in neutral or free spindle position. This position will be subsequently described in detail. This free spindle position, as will be apparent on examination of the gear positions, entirely disconnects the spindle shaft from the remainder of the transmission so that it is extremely easy to rotate the face plate 72 on the external end of the spindle shaft by hand when the work is being placed in position or manipulated. The details of the clutch are not disclosed, it being deemed sufficient to show the operating shaft 61 extending from the side of the clutch assembly for rotation or rocking movement by means of the bell crank lever 60 fixed thereon and connected by linkage to the hand levers.

The power driven pulley, through the clutch, is effective for driving a transmission shaft 75 journalled in the walls of the headstock, this shaft transmitting its rotative motion to the spindle through gearing and an intermediate shaft 76. The first shaft 75 or the one directly driven by the pulley carries two gear clusters 77, 78, each of which has two gears formed thereon, these gears being splined on the shaft and shiftable by respective hydraulically operated devices 79, 80. The size of the four gears 77$^a$, 77$^b$, 78$^a$, 78$^b$, thus carried by the first shaft is graduated. As will be disclosed later, the two hydraulic devices 79, 80, for shifting these gear clusters on the same shaft are hydraulically interlocked so as to prevent the shifting of one while the other is in mesh.

Adjacent these shiftable gears are four gears 81, 82, 83, and 84, respectively component to the gears on the shaft 75 and keyed to a sleeve 85 rotatively journalled on ball bearings on the intermediate shaft 76. It will readily be apparent that four speeds may be imparted to the aforesaid sleeve 85. The sleeve carrying the four gears on the intermediate shaft has a gear 86 formed thereon, this gear being engaged by the first of two gears 88$^a$, 88$^b$, contained in a cluster 88 slidably keyed to a sleeve 89 rotatively journalled on the spindle. The other gear 88$^b$ of the cluster last mentioned is adapted to mesh with the smallest gear namely 81 of the four gears on the sleeve of the intermediate shaft. A hydraulically operating shifting means 90 is provided for shifting this cluster 88 for alternate mesh with the gear 86 integral with the loose sleeve of the intermediate shaft and the small gear 81 of the four gear cluster keyed to the sleeve. Thus it will be apparent that eight speeds may be imparted to the spindle through the arrangement described up to the present point.

The sleeve 89 mounted for loose rotative movement on the spindle shaft is connectable to the spindle shaft by means of a hydraulically operated shifting device, which device will be better described at a subsequent position in the description.

The loose sleeve 89 on the spindle shaft has a gear 91 formed on its end, which gear is in constant mesh with a large gear 92 fixed to the intermediate shaft 76. The intermediate shaft 76 carries a small gear pinion 93 in splined connection therewith and slidable by means of a hydraulically operated shifting device 94 for meshing with a large gear 95 keyed to the spindle.

Thus it is possible through the back gearing represented by gears 90 and 91 on the intermediate shaft, to impart eight speeds to the intermediate shaft. For transmitting the eight speeds imparted to the loose sleeve 89 on the spindle shaft directly to the spindle, an internal gear element 96 is splined to the hub of the large gear 95, keyed to the spindle, for mesh with a gear 97 formed on the end of the sleeve 89, the shifting of this gear 96 being accomplished by means of a hydraulically operated shifting device 99.

The spindle shaft is journalled in the walls of the casing in roller bearings and extends through the forward wall of the casing. The face plate 72 is mounted on the extended end of the spindle for carrying the desired work or for carrying a work point if desired.

The spindle shaft is journalled in roller bearings in the end walls of the headstock casing. The gears 88$^a$, 88$^b$, 91 and 95, which are mounted on the spindle shaft for the purpose of transmitting power thereto, are located adjacent the bearings which journal the shaft. The gears 88$^a$, 88$^b$, and 91, through which the power is transmitted to the sleeve 89, loosely mounted on the spindle shaft, and thence transmitted to the intermediate shaft, are located as nearly adjacent the bearing at that end of the shaft as possible. Likewise, the gear 95 which is keyed to the spindle shaft at the forward end thereof, is located close up to the bearing journalling the forward end of the shaft. Therefore, as the motive power is delivered to the mentioned gears, there is less tendency for the spindle shaft to be sprung than would be the case if the gears were located at the central or unsupported part of the spindle shaft. Any springing of the spindle shaft disaligns the axis thereof displacing the work point or the work plate and causing inaccuracy in the work. The thrusts therefore are taken close to the supported parts of the shaft with the result that springing of the shaft is practically eliminated.

The foregoing arrangement of gears, therefore, is suitable for imparting sixteen speeds to the spindle. It is obvious that the present hydraulic gear shifting system can be readily applied for any number of gear shifts, the present transmission being arbitrarily selected as representing a typical environment.

The pump 100 for developing the fluid pressure for shifting the gears is driven from the constantly rotating shaft upon which the driving pulley and clutch are disposed.

As shown in Figures 5 and 6 a substantial oil level is maintained in the bottom of the headstock transmission casing and this oil is free to flow through a port 101 into the casing compartment housing the reversing gearing and clutch 74 for the main power control. The pump 100 is mounted in this casing and is driven by means of a gear 102, mounted on a shaft extension of the pump, in mesh with a gear 103 mounted on a constantly rotating power reversing shaft 104 of the reversing gearing driven through a pinion 105 and gear 106, the latter gear being mounted on the power shaft section carrying the pulley 73. The pump draws the oil through a screen intake 107 and delivers it through a supply conduit 108 extending to the main control valve 63. Through this power connection for the pump, as long as the main power to the lathe is on, the pump will continue to function and deliver a fluid pressure to the control valve where, in the event the control valve is in position to cut off the flow, the oil will be delivered through a relief valve 109 (see diagrammatic views), then to a lubricant reservoir 110.

The control valve is mounted in a boss formed in a wall of the headstock casing. Under all conditions of operation, the fluid delivered under pressure is blocked or obstructed in the selector valve, the purpose being to maintain a pressure head in the selector valve, which valve controls the delivery to the hydraulically operated shifting devices 79, 80, 90, 94 and 99. The constantly maintained fluid pressure is effective for holding the particular parts in certain definite shifted positions, and is relieved over a certain pressure through the relief valve 109 and conduit to the lubricant reservoir 110. The relief valve 109 located in this line is of a type readily arbitrarily set to relieve at any desired pressure, the relief in the present case occurring when the pressure head is developed above that sufficient for operating the various devices.

The lubricant reservoir is located above all of the bearings of the transmission and, therefore, in the upper region of the headstock. Various conduits 111 extend from the reservoir downwardly to the various bearings of the transmission, the fluid flow therefore being gravity induced from the reservoir to the bearings. The fluid delivered under pressure to the control valve is selectively delivered into a particular one of a pair of conduits 112, 113 extending from the control valve to the selector valve 39. The positions of the control valve are determined by the positions of the clutch, there being two positions corresponding to the clutched and unclutched positions of the clutch regardless of direction of drive.

The two conduits extending to the selector valve are for two distinct purposes. The one namely 112 which is connected to the main supply, when the clutch is out, is for the purpose of establishing the neutral or seventeenth position of the gear transmission; whereas the other namely 113 is for the purpose of delivering the fluid under pressure to those particular gear shifting devices which are in communication with the main chamber of the selector valve as determined by the set position thereof.

There is still a fourth connection to the control valve, this being in the form of a stand-pipe 114 which is connected to the main chamber of the selector valve when the clutch is out for permitting a gravity feed of the fluid in the stand-pipe directly to the system for constituting, in the event of leakage, a reserve fluid supply when the pump is idle due to non-use of the lathe. Furthermore, the interior of the valve is thus opened through the stand-pipe for releasing the hydraulically operated detent therein and permitting resetting of the valve when the clutch is out or in neutral. The stand-pipe has an open reservoir 114ª secured on its upper end.

The mechanism for operating the control valve and the structure of the control valve are of the following nature. The cam segment 62 mounted on the operating shaft 61 of the clutch has its peripheral surface in engagement with a roller 115ª on the upper end of the moving element or plunger 115 of the control valve 63. The cam is symmetrical having a central notch 116 therein, which notch receives the roller of the valve plunger when the clutch is in neutral position.

The plunger is urged upwardly by means of a spring 117 for causing the plunger to move depending on its contact with the periphery of the cam. The respective side portions of the cam induce downward movement of the plunger in either forward or reverse drive of the transmission. The plunger intermediate of its length includes annular grooves 118, 119 spaced apart and alternately registering with the inlet port for the supply conduit 108 which extends radially into the valve casing.

The conduit 112 extending from the control valve 63 to the selector valve 39 for establishing neutral or seventeenth position is connected to the control valve casing through a radial port adapted to register with the lower groove 118 of the plunger when this groove is in registry with the main supply, namely in the upper position of the plunger or neutral clutch position (see Figure 8). The other conduit 113 extending to the central chamber of the selector valve is connected to a port in the control valve casing registering with the upper groove 119 when the lower groove connects the mentioned conduits 108 and 112. This position of the control valve, as has been described before, occurs during the unclutched position and the conduit 113 is connected to the stand-pipe 120 through the groove 119. The stand-pipe is connected to a longitudinal groove 120ª in the valve casing internal wall surface connecting with the upper groove 119 at the mentioned position.

Rocking of the cam 62 in either direction for forward or reverse power transmissions and depression of the plunger connects the main supply conduit 108 with the conduit 113 extending to the central chamber of the selector valve since the upper groove 119 is moved into registry with these two conduits 108, 113, the stand-pipe 114 and the conduit 112 extending to the selector valve for neutral position being cut off at this time.

Figure 8 of the drawings is illustrative of the unclutched position of the transmission since it shows the apparatus in neutral or seventeenth position.

The selector valve has its casing 40 supported in a bracket 40ª (see Figure 2) attached internally of and to the head-stock casing for accommodating a dual rotative connection to the valve element 41 as previously described.

The rotatable element 41 of the valve has a plurality of grooves formed therein (see Figure 10). The conduit 113 extending from the control valve to the selector valve, which conduit is connected to the fluid pressure means when the clutch is in, communicates with a regular annular groove 121 in the periphery of the rotatable valve element, being in constant registry with this annular groove. The annular groove 121 communicates with the interior of the rotatable valve element through a plurality of radial ports 122.

A hydraulically operated detent 123 is longitudinally slidably mounted within the chamber of the rotatable valve element, being urged toward the rear end of the valve by a spring 124 under compression between the closed opposite end of the valve inner chamber and a bore within the detent. The head end of the detent 123 includes a series of teeth adapted to engage with teeth formed on the inner face of an end cap 125 of the valve casing. The head 126 of the slidable detent fits into a cross slot 127 in the end of the rotatable valve element for the purpose of connecting the detent and valve element unitarily non-rotatively within the casing when the teeth of the detent are meshed with the teeth of the cap 125. The number of teeth on the detent corresponds to the number of selector valve positions, as seventeen in this case.

The radial supply ports 122 extending inwardly from the annular groove 121 are continued through the detent and enter the interior of the rotatable valve element via the spring receiving bore of the detent. The communication between the conduit entering the annular groove and the interior of the valve is constant and it is, therefore, obvious that the fluid pressure is either supplied to the central chamber or exhausted therefrom depending on the position of the clutch. When the fluid pressure is supplied and during power transmission, the detent is locked in meshed position due to the fluid pressure on its inner end, and it is impossible to rotate the valve element therefore making it impossible to change the gears when the power is in.

Apart from the annular groove 121 which either supplies or exhausts the interior of the valve, the exhaust being for purposes of detent release and valve chamber connection to the stand-pipe, there are two other sets of grooves in the periphery of the rotatable valve element. The first group of grooves, at the right hand end of the valve as shown, is disposed in the first five transverse planes of the rotatable valve element, and with radial supply ports in the movable valve element is designed for controlling the delivery, exhaust, and trapping of the fluid under pressure for the particular shifting devices effecting the sixteen speed changes. The second set or that set at the left hand end of the valve as shown, is inclusive of five grooved transverse planes of the rotatable valve element, and this group is for the purpose of controlling the seventeenth or free spindle position.

The rotatable valve element has seventeen rotatable positions, the positions being determined by the number of teeth on the detent and therefore making it possible to accurately set the dial for any one of these seventeen positions by moving the rotatable valve element the desired number of teeth. The first mentioned group of grooves are interconnected to make up a continuous passageway 128 (see Figure 10) and exhaust through common exhaust ports in the casing. In the same sections of the valve are radial supply ports extending from the periphery of the rotatable valve element into the interior chamber thereof. These radial supply ports are arbitrarily registered with radial ports in the valve casing connected by conduits to the particular shifting devices. The irregular grooving 128 constituting a continuous passageway for exhausting purposes, registers with the conduits coming in from the respective shifting devices for exhaust at appropriate times, the exhaust taking place through a plurality of radial passageways 129 in the casing extending to the exterior thereof and adapted to deliver the exhausted fluid to the lower region of the headstock where it is repumped back into the system. For the purpose of clarifying the description, the second mentioned group of openings and grooves accomplishing the seventeenth or neutral free spindle position will be omitted until the full description of the means for accomplishing the speed changes has been given.

*Extreme low speed transmission*

The extreme low speed position of the valve and resultant shifted positions of the gears and shifting devices will be set forth in the following description detailing the structure of the selector valve and the shifting devices. This position has been diagrammatically illustrated in Figure 7. For the purpose of disclosing the exact structure of the selector valve, reference is also made to Figures 9 and 10. The valve element development shown in Figure 10 is taken or worked from a line coincidental with the principal pipe connections controlling neutral position or seventeenth position.

The developed view illustrates the interconnected exhaust grooves 128 for exhausting through common ports 129 from the first five transverse planes of the first group of ports and passageways effecting the sixteen positions.

Referring to the general diagrammatic view, illustrating low speed position and including various transverse sections of the valve, it will be noted that the conduits extending from the second transverse sectional plane from the right hand end of the selector valve (same as Figures 11 and 22) extend to the two shifting devices 79, 80, respectively controlling the shifting of the two gear clusters 77, 78, on the first shaft 75 of the transmission. The conduits extending from the third transverse sectional plane of the valve (same as Figures 12 and 23) also control the operation of these mentioned hydraulic shifting devices 79, 80. In the second transverse plane of the selector valve the rotatable valve element includes four radial supply ports 132 extending from its interior. These four ports are arranged substantially 90° apart and one thereof is adapted to register in low speed position with a supply conduit 133 extending to the hydraulic shifting device 80 of the large gear cluster 78 through its particular interlock means and thence to the hydraulic shifting device 79 for the small gear cluster 77 for shifting the same and meshing the smallest gear 77ª of the small gear cluster with the large gear 84 of the group of four on the intermediate shaft 76.

It is necessary at this time, to positively balance the first mentioned shifting device 80 in neutral or intermediate position whereby the gears of the cluster controlled thereby are held out of mesh in order to permit passage of fluid through the interlock. For this purpose a supply conduit 134 extends from the third transverse plane of the selector valve. In the instance of the third transverse plane there are eight radial supply ports 135 in the rotatable valve element arranged in groups of two at substantially 90° apart.

In the position described, one of the supply ports 135 of a group is in registry with the supply conduit 134 previously mentioned. This supply conduit 134 is forked to extend to both ends of the shifting device 80. Each of the respective forks enter the region of a cylinder 136 at the rear of a floating piston 137. The floating pistons in this position are engaged against the respectively adjacent ends of a shifting plunger 138 carrying a yoke element 139 in engagement with the gear cluster 78. Each floating piston 137 includes plunger contacting extensions 140 of larger diameter than the plunger 138 and of smaller diameter than the piston 137, there being an extension 140 at each end of the floating piston for constituting the abutment means engaging the ends of the cylinders for providing clearance around the ends of the pistons when they are urged against the ends of the cylinders and the plungers.

The shifting plunger is of a length corresponding exactly to the distance between the adjacent ends of the cylinders housing the respective floating pistons so that the introduction of fluid pressure behind the floating pistons effectively balances the plunger in intermediate position. An interlock plunger 141 is pinned to the shifting plunger and yoke element and slides in the cylinder bodies above the floating piston cylinders. Each end of the interlock plunger has an annular groove 142 therein, these grooves being adapted to control, by registration, the respective supply lines extending to the presently actuated shifting device 79.

Referring again to the supply conduit 133 for the shifting device 79 effecting the present gear shift, it will be noted that the annular groove 142 at the particular end of the interlock plunger overlaps the respective radial ports 143 of the respective sections of conduit 133 adapted to be coupled. These ports are circumferentially placed at 90° apart so as to permit convenient attachment and overlapping by the annular groove in the interlocked plunger. Therefore, this supply conduit 133 is connected to the shifting device 79 only by the positioning of the shifting device 80 in intermediate position.

The conduit 133 is connected to the shifting device 79 for introducing the fluid into a cylinder at the end of the shifting plunger 138 between the floating piston 137 and the shifting plunger. The shifting device 79 identical in construction to device 80 must necessarily be exhausted at the end of its shifting plunger opposite to that being supplied as well as being exhausted at the side of the floating piston opposite to that into which the fluid is being introduced. Therefore, a conduit 144, same as balancing supply conduit 134 but functioning as an exhaust, extends between these two cylinder ends and the selector valve casing, the conduit entering into the third transverse plane of the valve and connecting with a circumferential fork of the main exhaust passage 128 in the rotatable element of the selector valve and thence exhausting through the radial ports 129 in the casing to the reservoir.

The cylinder of the shifting device 79 toward which the shifting plunger is being moved, is also exhausted on the side opposite to that exhausted through the conduit 144, this exhaust taking place through a conduit 146 extending to an interlock groove of the shifting device 80 and thence through the aligned groove, aligned with the conduit sections, to the selector valve casing and thence through another circumferential fork of the exhaust in the second transverse plane of the valve.

Prior to the shift of the shifting device 79, the forward ends of the respective floating piston cylinders of the device 80, being balanced or moved into neutral, are exhausted to permit the coincidental plunger balancing movement of the floating or balancing pistons. Therefore, from each cylinder of the device 80 respective conduits 148, 149 extend to the respective annular grooves of the interlock plunger on the shifting device 79, this interlock plunger being moved into intermediate or balanced position prior to the shift to low speed position. These conduits 148, 149 are connected to the valve in the second section of the valve and are in registry with a fork of the exhaust groove 128. As soon as the balance has been obtained in the shifting device 80, it will be seen that the supply and exhaust ports are properly arranged for operation of the shifting device 79 in either direction. This is true of both shifting devices 79, 80, the shifting of one depending on the balanced position of the other. The described gear shift effects the first of a series of gear changes occurring simultaneously through one setting of the selector valve for the low speed drive to the spindle.

For the purpose of the second change of this speed, the shifting device 90 engages the gear cluster 88 slidably mounted on the gear sleeve 89 mounted on the spindle shaft 71. The shift in this instance causes meshing of the large gear 88ª of the cluster with the small gear 86 loosely mounted on the intermediate shaft so that the drive proceeds, at this point of description, to the loosely and rotatably mounted sleeve 89 on the spindle.

The shifting device for moving this last mentioned gear cluster includes a cylinder 150 mounted in the headstock casing wall and a plunger 151 within the cylinder, the plunger having a yoke 152 pinned to its extending end and the yoke slidably mounted on a stud 153 secured in and extending from the casing wall, the yoke engaging the gear cluster 88. The plunger 151 includes an enlarged diameter portion or head 154 slidably mounted in the cylinder and a smaller diameter portion extending through a sleeve insert 155, secured in the end of the cylinder, for carrying the yoke. The head at its outer end has a reduced diameter portion 156 providing an extension for abutting the end of the cylinder, the groove permitting the entrance of fluid under pressure against the head of the plunger even though the head, through its extension is abutting the end of the cylinder.

For shifting the gears at this time, the fluid under pressure is introduced against the inner end of the head about the small diameter portion of the plunger. The entrance of fluid under pressure is made easier by a chamfered inner end of the sleeve insert 155 providing clearance at the fluid entrance when the inner end of the head is abutting the sleeve. The fluid is introduced at this point by means of a conduit 157 extending from the fourth transverse plane of the valve and in registry at this time with one of a series of supply ports 158. These ports are arranged at substantially diametrically opposite sides of the valve in groups of four. The other end of the cylinder or the region at the outer end of the plunger head is exhausted through a conduit 159 extending to the fourth transverse plane of the valve and exhausting through a fork of the main or common exhaust groove 128.

This shifting device 90 has only two positions, both of which are positions of gear engagement and therefore does not include the balancing or floating pistons or interlock means included in the first two shifting devices 79, 80.

From the point of this gear engagement, the drive proceeds through the loosely mounted sleeve 89 by way of its end gear 91 which is a small gear in mesh with the large gear 92 keyed to the intermediate shaft whereupon the intermediate shaft drives the spindle, as will now be described, through the meshing of the slidable pinion 93 thereon with the large gear 95 keyed to the spindle.

Since there is another drive connection from the end of the loose sleeve 89 directly to the large gear 95 and the spindle, it is necessary to interlock the hydraulic shifting devices 94, 99 which alternately accomplish these gear connections. In the present speed, as has been stated, the pinion is in engagement with the large gear. The construction of these shifting devices for accomplishing these two shifts is identical with the construction of the shifting device 90, for connecting the intermediate shaft 76 with the sleeve 89 on the spindle, in respect to the general construction including two positions. These positions are, however, positions of gear mesh and unmesh. Another difference between these last two mentioned devices 94, 99 and the one previously mentioned is that a hydraulic interlock is included between the devices 94, 99 for the purpose of preventing shifting of one device and meshing of its gear when the other has been shifted to move its gear into mesh.

The conduits extending from the fifth transverse plane (same as Figures 14 and 28) of the valve extend to both of the devices for flow through the respective interlocks at the appropriate times. One of these conduits namely 161 is supplied at this time through registry with a radial supply port 162 in the selector valve.

In respect to the conduit connection 161 to both the hydraulic devices 94, 99, which device is effective for gear engagement through device 94 at this time, the fluid must pass through an interlock groove 163 in the plunger 164 of the device 99 through the previously described arrangement of conduit connections relative to the groove, this conduit extends back to the shifting device 94 entering the region of the cylinder at the rear of the head 165 of the plunger 164 for the purpose of moving the plunger to move the pinion 93 into mesh with the large gear 95 by means of the yoke 166 connecting the plunger and pinion and guided on a stud 167. For the purpose of exhausting the region of the cylinder at the opposite side of the plunger head, a conduit 168 extends to the seventh transverse plane of the valve (same as Figures 16 and 27) and communicates with a branch or fork of a pressure relief passageway 169 (connected to the exhaust at this time as will be described later).

The annular grooves 163 on the plunger of the device 94 constituting a part of the interlock, are disaligned from registry at this time preventing fluid pressure flow through the conduit 161 which controls the fluid pressure flow to the cylinder of the hydraulic device 99 which connects the sleeve 89 directly to the large gear.

Another conduit 170 connects the fifth transverse plane of the selector valve with both shifting devices. The annular pressure relief passageway 169 of the transverse section is connected (see Figure 10) with an annular groove or relief passageway 171 in the sixth transverse plane (same as Figures 15 and 26). At this time this groove 171 is in registration with the port of the conduit 172 extending to and passing through an aligned annular interlock groove 163 of the plunger 164 in the device 99 and connecting through conduit 170 to the fifth transverse plane and an exhaust fork of the main exhaust 128. Thus the exhaust for conduit 168 extending from device 94 is effected via the connected groove 169 in the seventh plane and groove 171 in the sixth plane.

At this time the oil at both ends of the cylinder of the hydraulic device 99 is dead since the respective conduits connected thereto are cut off by the plunger of the shifted device 94. One of these conduits namely 173 extends from the rear end of the cylinder of device 99 to the ninth transverse plane (see Figures 16 and 27) for a connection to an annular relief passageway 174, the ninth transverse plane being shown superposed on the seventh transverse plane in Figure 7 and in the Figures 16 and 27 inasmuch as the grooving and porting in these two sectional planes is identical.

The annular relief passageway 174 is connected to a similar groove 175 in the tenth transverse plane (see Figures 15 and 26) this plane being shown superposed on the sixth plane in Figure 7 and in Figures 15 and 26 since they are precisely the same. A conduit 176 extends from the tenth plane to the device 94, this conduit being cut off from its connection to conduit 161 by the piston of the shifted device 94. The other conduit namely 177, extending from the head end of the cylinder of the device 99, extends directly to the device 94 and is cut off by the plunger 164 thereof. The eighth transverse plane of the valve includes a supply groove 178 fed from the main control valve 63 through conduit 112 when the clutch is out for supplying the appropriate ends of the cylinders of the last mentioned two hydraulic devices 94, 99 to move the respective gears out of mesh for the seventeenth or neutral position as will be set forth hereinafter.

The eleventh transverse plane (see Figures 18 and 29) shows the main supply intake ports and passageway 113 extending from the valve casing 40 through groove 121 through the rotatable element 41 and the detent 123 via ports 122 to the interior or main supply chamber of the valve, this passageway 113 being connected to the supply through the main control valve 63 when the clutch is in for either direction of drive. The first transverse plane which has also been shown in the diagrammatic views has no connections shown thereto but includes the ports 129 for exhausting the common exhaust groove 128 present in the first five planes, the exhaust taking place through the radial ports extending from a completely circumferentially extended portion of the exhaust groove 128 in the valve element for discharging into the interior of the transmission casing.

It will be noted that in the event of fluid pressure connection to either one of the hydraulic devices, controlling the connection of the intermediate shaft 76 to the large gear 95 or the connection of the sleeve 89 to the large gear 95, the supply can pass around the plunger of the idle device when the annular grooves are properly aligned, these grooves only being aligned when the gear moved by the respective plunger is out of mesh.

*Neutral or free spindle transmission position*

Assuming that from the low speed position the operator wishes to place the transmission in seventeenth or neutral position in order to permit easy manipulation of the face plate 72, the dial is then turned in anti-clockwise direction the rotative distance of one tooth or one speed change as indicated on the dial. Thereupon the various ports and grooves of the valve assume the positions of registry indicated in Figures 8 and 9, and Figures 11 to 19 inclusive.

In respect to the seventeenth or neutral position, the developed view (see Figure 10) of the valve has been spread from the diametric line containing the main ports and passageways which control this position. When this diametric line or longitudinal central plane is vertically positioned as shown in Figures 8 and 9 of the drawings, the various connections are functioning for neutralizing the entire transmission. All the conduit connections extending from the selector valve to the various shifting devices (sectional views 11 to 14 inclusive) are then connected to the common exhaust groove in the rotatable element of the selector valve, thus exhausting all conduits extending to the shifting devices which might supply gear engaging fluid pressure. The sectional views 15 to 17 inclusive show the transverse planes of the valve which contain grooves controlling the shifting operation for free spindle position.

It occurs, in moving from low to neutral position, that a number of the gears may be left in gear engagement, but due to the particular positioning of the grooving in the valve as hereinafter described, it is positively provided that either one of the gears 93, 96 connecting the intermediate shaft 76 to the spindle shaft 71 or connecting the loose sleeve 89 directly to the spindle shaft is withdrawn from meshed position and the spindle left free to rotate easily without the necessity of moving back gearing when the face plate is manipulated. In the previous or low speed position the conduit 133 in the second plane or Figure 11 extending to the hydraulic shifting device 79, had been in registry with a main supply port 132 extending from the center of the valve. This conduit 133 now registers with a fork of the exhaust groove 128 which is of a circumferential length suitable for exhausting the four circumferentially successively arranged conduits 133, 146, 149, 148 simultaneously. Likewise, the conduit 134 extending from device 80 to the third transverse plane or Figure 12 which conduit has previously been a fluid pressure supply connection, is now connected with the common exhaust groove 128.

In the fourth transverse plane or Figure 13 where the conduit 157 had previously been supplied with fluid under pressure for shifting the gear 88ª of the gear cluster 88 on the sleeve 89 of the spindle into mesh with the small gear 86 of the intermediate shaft 76, this conduit 157 is now connected to the main exhaust groove 128. The conduit 161 extending from the fifth transverse plane, or Figure 14, which had previously been connected to the main pressure supply chamber for moving the pinion 93 on the intermediate shaft into mesh with the spindle gear 95 is now in connection with the main exhaust groove 128.

Regarding the sixth and tenth transverse planes (see Figure 15) through a break, for the present position, in the annular relief grooves 171, 175 of these planes, the conduits 172, 176, extending from the respective planes to the respective hydraulic shifting devices controlling the last two shiftable gears 93, 96, in the train, are totally cut off and rendered inoperative. For this neutral or seventeenth position the conduits 168, 173, entering the seventh and ninth transverse planes (see Figure 16) are supplied from the main supply conduit 112 extending to the eighth transverse plane from the main control valve 63. The circumferential groove 178 in the eighth plane or Figure 17 connects with a longitudinal groove which extends to the next adjacent planes at each side (see Figure 16).

Tracing the conduit 168 which extends from the seventh transverse plane (see Figure 16), it will be noted that it supplies the forward end of the cylinder of the hydraulic shifting device 94 for moving the pinion gear 93 out of mesh with the large gear 95 on the spindle, this gear having been in mesh in the preceding low speed position.

The conduit 173 extending from the ninth transverse plane (see Figure 16), extends to and supplies the rear end of the cylinder of the hydraulic device 99. It occurs in the present shifting sequence that the plunger of this last mentioned device 99 is not moved by this last connection since it had been previously held in unmeshed position. The purpose of the seventeenth position, as will be apparent from the above connections is to absolutely move both the pinion gear 93 and the gear 96 out of engagement so that the spindle is entirely free from any gear connection. Therefore, it will be seen that after the operator has set the dial to indicate seventeenth or neutral position, the clutch being out, the immediate effect is to deliver fluid from the main supply line 108 extending from the pump to the control valve 63, thence through the conduit 112 to the selector valve and through the conduits 168, 173, extending from the selector valve to the respective ends of the cylinders mentioned.

Through the provision of the hydraulic detent in the selector valve, it is impossible to shift gears while the clutch is in. Moreover, any change made in the position of the dial when the clutch is out, excepting seventeenth position, only becomes effective for shifting gears when the clutch lever is moved to connect the power, the shifting operation occurring automatically in the first phase of throw-in movement of the clutch lever. The interlock between the hydraulic shifting devices concerned in the total disengagement of the spindle is rendered inoperative by positioning the dial in seventeenth position since at this time it is of no importance. To this purpose, the conduits 161, 170, extending between the respective shifting devices and adapted to be connected with conduits on the opposite sides of the respective devices, are registered with the circumferential groove of the common exhaust passage 128 in the fifth transverse plane.

Figure 31 of the drawings has been enlarged out of the neutral or free spindle position layout (Figure 8) for the purpose of clearly showing the interlock for preventing shifting of one connection to the large gear on the spindle while the other connection to the spindle is in or vice versa. It will be observed from this view that the exhaust for the inner end of the hydraulically operated shifting device 94 which is being moved from position of gear mesh to position of gear unmesh, takes place through the conduit 161 extending through the annular interlock groove of the device 99 which holds its gear out of mesh, thence to the exhaust groove 128 in the fifth transverse plane of the selector valve and to the exterior for return to the sump. The only supply conduits in this position are those conduits 172, 176, which extend from the seventh and ninth transverse planes to the cylinders, the remainder either containing dead fluid or fluid being exhausted.

*Extreme high speed transmission position*

Assuming a move from neutral or seventeenth position to extremely high speed, the operator has but to move the selector valve anti-clockwise one notch. For this position, reference is had to Figures 20 to 30 inclusive. For this extremely high position, the positions of the first two hydraulic shifting devices 79, 80, of the series are reversed. As shown in the second transverse plane of the selector valve, one, namely 148, of the four conduits, all of which had previously been exhausted, registers with a radially disposed fluid supply port 132. This conduit 148 extends to the interlock of the shifting device 79 for passage, after the device 79 has been moved into balanced or neutral position, to the shifting device 80 for shifting the same.

The sections of the conduit 148 are connected through the annular groove of the interlock plunger which is first balanced as hereinafter described, and the fluid supply then proceeds to the device 80 to be shifted and supplies the pressure between the floating or balancing piston 137 and the end of the shifting plunger 138 in the appropriate cylinder 136 of the device 80 for moving the large gear cluster 78 to mesh the large gear 78ᵇ thereof with the small gear 81 on the intermediate shaft 76.

The forked conduit 144 of the device 79, which is to be balanced at this time, is connected through a port 135 in the third transverse plane to the main supply chamber in the interior of the valve for bringing the balancing pistons 137—137 toward each other and against the respective ends of the shifting plunger 138 for effecting the balanced or neutral condition of the shifting device 79. Also both those conduits 133, 146, which extend through the respective interlock grooves 142 of the shifting device 80, or the one about to be shifted, and which accomplish the shifting of the shifting device 79 in reverse directions, are open to exhaust by way of the exhaust groove 128 in the second transverse plane.

At this time the opposite end of the cylinder 136 at the opposite end of the shifting plunger 138 of device 80 has the region thereof at the inner side of the floating piston 137 exhausted by way of the conduit 149, through interlock groove 142 of device 79, to the second transverse plane and the main exhaust groove 128. Both the floating pistons 137 of the device 80 being shifted at this time are free to move in view of the fact that their respective cylinders 136 are exhausted on the side toward which they are moved by way of the forked passageway 134 which extends to the third transverse plane and exhausts at this time through the main exhaust groove 128. Thus the highest possible speed is imparted from the first shaft 75 to the intermediate shaft 76.

Another gear change which is occurring at this same time is the disengagement of the large gear 88ª of the cluster 88 splined on the sleeve of the spindle from the small gear 86 and the meshing of the small gear 88ᵇ of this cluster with a gear 81 of the cluster of four on the intermediate shaft 76. For the accomplishment of this change the hydraulic shifting device 90 connected to this gear cluster is reversed as to position by reversing the supply and exhaust thereto.

The conduit 157 which in low speed position supplies fluid pressure to the rear side of the plunger head is now effective for exhausting from this side by way of the main exhaust passage 128 in the fourth transverse plane, whereas the previously exhausted conduit 159 is now effective for supplying fluid pressure through connection with the main supply chamber within the valve by way of a radial port 158 in the fourth transverse plane. Thus the lowest possible speed is imparted to the spindle sleeve 89 and the intermediate shaft 76 whereby the drive can either be taken from the sleeve 89 or from the intermediate shaft 76 to the spindle shaft.

In the high speed position, the drive is taken directly from the sleeve 89 to the spindle 71 by way of the gear 96 in splined connection on the hub of the large gear 95. The slidable internally toothed element on the hub of the gear is meshed with the gear 97 secured on the end of the sleeve by its shifting device 99. For this purpose, the supply is from the center of the selector valve through a radial port in the fifth transverse plane, thence to the registering conduit 170 to the interlock of device 94, which moves the pinion 93, through this interlock groove in view of the disengaged condition of the gear 93 and proper position of the hydraulic shifting device 94, thence by way of the conduit 177 to the head end of the plunger 164 in the hydraulic device 99 whereupon the plunger is moved for effecting shifting of the internal gear 96 and meshing thereof with gear 97.

The opposite end of the cylinder of shifting device 99 is exhausted by way of the conduit 173 extending to the ninth sectional plane of the selector valve; thence connected over to the tenth plane, through the connected annular passageways 174, 175, in the selector valve element, by way of the conduit 176 through the interlock groove 163 of the hydraulic device 94, thence through the conduit 161 extending back to the fifth sectional plane of the valve and to the exhaust groove 128 through the radial ports 129 in the valve casing to the sump.

The other hydraulic shifting device 94 of these two or the one controlling the shifting of the pinion, is left in the same position at which it was placed at the time of the neutral or seventeenth position shift. This maintenance will be apparent in following the course of fluid pressure and exhaust at this position of the valve. It will be noticed that the conduit 168 which extends to the head end of this hydraulic shifting device 94 connects to the seventh sectional plane of the valve where connection is had with the annular groove 169 in the valve element; thence connected over one plane to the sixth sectional plane; thence by way of conduit 172 to the plunger of the hydraulic shifting device 99 which has just been shifted and then ineffective for further passage in view of the disalignment of the interlock groove 163 at this point. The oil, therefore, in the head end of the cylinder is dead or trapped, and therefore, still effective for holding the plunger 164 in its shifted position.

The other end of the cylinder of device 94 has been exhausted through conduit 161 which extends to the interlock inlet of the hydraulic device 99 just shifted where it also is cut off due to displacement of the particular interlock annular groove 163. It will be observed, therefore, that the fluid is either under pressure in the system directly from the pump, or it is being exhausted or is trapped or considered as dead oil, the latter condition being effective for holding those parts, which it has previously moved, in set position.

*Valve port arrangement*

Referring first to those views showing the second to fifth sectional planes inclusive of the valve, it will be noted that the radial ports and exhaust grooving is regular with the exception of one portion in the circumference of the valve, this portion being added for the purpose of the seventeenth position. The sixth to tenth sectional planes of the valve include annular grooves in the movable element extending substantially all the way around the valve with the exception of the eighth plane for interconnecting the passageways effecting seventeenth position during the sixteen speed changes and this grooving only being effective for delivering fluid pressure at one position of the selector valve, namely the seventeenth.

Referring back to the description wherein it is stated that the supply porting and exhausting grooving is regular with the named exception, it will be seen that in the second sectional plane, if the valve is successively moved anti-clockwise from high speed position, counting the high speed position, a supply port 132 will be connected to the four conduits 133, 146, 149, 148 extending from this plane in succession with the exhaust effective for the other three. The high speed position which has just been described places the largest gear 78ᵇ on the first shaft 75 of the transmission in mesh with the small gear 81 of the cluster of four on the intermediate shaft 76.

Moving the radial supply port to the next conduit by anti-clockwise movement, the supply is delivered to the opposite end of the first shifting device 80 of the mechanism for moving the second largest gear 78ᵃ on the first shaft into mesh with its component gear on the intermediate shaft 76, the opposite end of the cylinder of the hydraulic device being exhausted at this time. During these two speed changes which are the highest and the next to the highest, the fluid pressure supply has been constant to the hydraulic shifting device 79 of this interlocked group, for balancing the same, through two successively registering supply ports 135 in the third plane registering with the supply conduit 144 extending to the mentioned shifting device. This condition will be reversed upon a third dial movement, and the pair of supply ports will register successively with the conduit 134 in the third transverse plane for operating to balance the previously operated shifting device 80, whereas the alignment of the supply port 132 in the second transverse plane with the next two succeeding conduits 146, 133, will effect shifting of the hydraulic shifting device 79 in reverse directions. This cycle of four shifts will be repeated four times in the rotation of the valve, as will readily be apparent, due to the regular arrangement of the ports as described.

During these first four high speed changes, the porting arrangement in the fourth transverse plane has been effective for maintaining the hydraulic shifting device 90 in the same position described for highest speed. When the second cycle of movement of the second and third transverse planes takes place, the hydraulic shifting device 90 will be reversed due to the successive registration of four supply ports 158 with the conduit 157 entering this fourth plane and the simultaneous exhausting of the conduit 159 previously functioning to supply pressure. Therefore, it follows that for the first series of gear changes on the first shaft, the hydraulic shifting device 90 is in one position, and for the next four in reverse position. Then on the third series of changes it is moved back to the original position.

The porting in the fifth sectional plane, controlling the shifting of the pinion 93 and the internal gear 96, maintains the gear 96 in position for eight speed changes, and then reverses for the last eight which condition will readily be seen from an examination of this section due to the successive aligning of eight supply ports 162 with each of the conduits 161, 170, extending from this section, alternately, and simultaneous exhausting of the one not being supplied.

Therefore, considering the shifts in groups of four as effected on the first four gears of the train, the hydraulic shifting device 90 will be maintained in one position and likewise the shifting devices 94, 99 controlling the pinion 93 and gear 96 on the spindle shaft. For the next four, the position of the hydraulic shifting device 90 will be reversed whereas the devices 94, 99, controlling the pinion 93 and the internal gear 96 will remain as for the first four. For the third four, the hydraulic device 90 will be returned to original position, whereas the shifting devices 94, 99, controlling the pinion and internal gear will be reversed as to meshed position. For the last four, the hydraulic device 90 will again be reversed, whereas the shifting devices 94, 99, will remain the same.

The hydraulic gear shifting apparatus and its various controls are adaptable for use in conjunction with any style of lathe for controlling the speed of rotation of the spindle. The controlling means may readily cooperate with standard transmission arrangements by re-arranging the parts to suit the particular environment.

Having described our invention, we claim:

1. In a hydraulic gear shifting system for a lathe, a spindle, a transmission for driving said spindle, a selector valve, a fluid pressure supply means for said selector valve, shifting devices associated with the respective shiftable gears of the transmission and having fluid connections to said selector valve for a plurality of speed changes, and means included in said selector valve and shifting devices for entirely disconnecting the spindle shaft from the remainder of the transmission at one position of the selector valve.

2. In a hydraulic gear shifting system for a lathe, a spindle, a clutch controlled transmission for driving said spindle of a lathe, a selector valve, a fluid pressure supply means for said selector valve controlled by the clutch actuation, shifting devices associated with the respective shiftable gears of the transmission and having fluid connections to said selector valve for a plurality of speed changes, and means included in said selector valve and shifting devices for entirely disconnecting the spindle shaft from the remainder of the transmission at one position of the selector valve, said means effective when the clutch is out.

3. A hydraulic apparatus for shifting the gears of a lathe, a clutch, an operating lever for said clutch, a fluid pressure means, a main control valve, shifting devices associated with the respective shiftable gears, a selector valve for controlling the fluid supply from the main control valve to the respective devices, said control valve operatively connected to the operating lever of the clutch and connecting the fluid pressure supply to the selector valve when the clutch is in for connecting the fluid pressure to the shifting devices for a gear shift.

4. In a hydraulic gear shifting apparatus for a lathe, a spindle shaft, a transmission for driving said spindle shaft, a fluid pressure means, a selector valve, shifting devices for the respective gears of the train, fluid connections between the selector valve and the respective devices, said selector valve having passageways therein for effecting a plurality of gear shift positions and for totally disconnecting all the gears of the train from the spindle shaft for free spindle movement when manipulation of the face plate on the spindle shaft is necessary.

5. In combination with the headstock, bed and carriage of a lathe; a hydraulic apparatus for shifting gears within the headstock, comprising, fluid pressure means within the headstock, a selector valve, a fluid connection from said pressure means to said selector valve, fluid actuated devices for the respective gears connected to and controlled by the selector valve for appropriately shifting the gears, and a dual control for operating the selector valve including a manipulating means on the headstock and a manipulating means on the carriage, the latter flexibly connected to the headstock.

6. In a hydraulic apparatus for shifting the gears of a lathe, speed change gearing, a clutch for controlling said gearing, an operating lever for the clutch, a fluid pressure means, a main control valve, fluid connection between said control valve and pressure means, a plurality of shifting devices associated with the respective gears, a selector valve having fluid connections to the shifting devices for controlling the fluid supply from the main control valve to the respective devices, said control valve operatively connected to the operating lever of the clutch and connecting the fluid pressure supply to the selector valve in either in or out position of the clutch for respectively connecting the fluid pressure for a gear shift or for a neutral position.

7. In a lathe, a headstock, a spindle, a transmission for driving said spindle including a sleeve loosely rotatably mounted on said spindle adjacent one bearing thereof, said sleeve having a gear at the end adjacent said bearing and a clutch element formed on its other end, a gear fixed to the spindle adjacent the other bearing thereof, means for rotating said sleeve, a clutch element splined to said fixed gear and adapted to cooperate with the clutch element formed on the end of the sleeve, and a back gearing meshing with the gear on the sleeve adjacent the bearing and adapted to be meshed with the fixed gear whereby drive may be imparted to the spindle from the sleeve either through the back gearing or through direct connection to the fixed gear through the splined gear.

8. In a hydraulic gear shifting system for shifting the gears within the headstock of a lathe, a speed change transmission, a clutch for said transmission, a control lever for said clutch, a fluid pressure developing means, a selector valve, a fluid connection between said fluid pressure developing means and said selector valve, a main control valve in said fluid connection adapted to be actuated by the clutch lever for admitting the fluid pressure to the selector valve when the clutch is in, shifting devices located adjacent the respective shiftable gears including hydraulically moved plungers, fluid connections between the selector valve and the respective shifting devices for supply and exhaust thereto, means for manipulating said selector valve for controlling the passage of the fluid pressure to the respective shifting devices, and a hydraulically operated detent mounted within the selector valve for locking the same in set position when the fluid pressure is admitted and the clutch is in.

9. In a hydraulic gear shifting system for shifting the gears of a lathe, a fluid pressure developing means, a selector valve, a fluid connection between said pressure developing means and said selector valve, shifting devices located adjacent the respective gears adapted to be shifted, including hydraulically moved plungers, fluid connections between the selector valve and the respective shifting devices for supply and exhaust thereto, means for manipulating said selector valve for selectively controlling the passage of the fluid pressure to the respective shifting devices, and a hydraulically operated detent mounted within the selector valve for locking the same in set position when the fluid pressure is admitted.

10. In a hydraulic gear shifting system for shifting the gears in the headstock of a lathe, a fluid pressure means, hydraulically actuated shifting devices disposed within the headstock for shifting the slidable gears of the train, a selector valve having fluid connection with said fluid pressure means, fluid connections between the selector valve and the respective hydraulically operated shifting devices, said selector valve including a casing to which said fluid connections are radially attached, and a hollow manually rotatable valve element including radial ports for admitting the fluid pressure to the interior thereof and selectively admitting the fluid pressure from the interior to the various supply connections to the hydraulically operated shifting devices, said casing having an exhaust port, and said rotatable valve element having exhaust grooves in its periphery in constant connection with said exhaust port, selectively registered with the fluid connections for exhausting the shifting devices.

11. In a hydraulic apparatus for shifting the gears of a lathe, a headstock for the lathe, speed change gearing in said headstock, a clutch for said speed change gearing, shifting means for said clutch, a fluid pressure developing means, a selector valve, a fluid connection from said pressure means to the selector valve, a main control valve inserted in said connection, hydraulically operated shifting devices located adjacent and connected to the respective shiftable gears of the transmission, fluid connections between the selector valve and said devices for operating the devices, said selector valve having a main supply chamber entered by said connection from the fluid pressure developing means, said main supply chamber selectively connected to the various supply conduits, said main control valve adapted to be actuated by the clutch shifting means for admitting the fluid pressure to the selector valve when the clutch is in, and a second fluid connection between said main control valve and said selector valve admitting the fluid pressure to the selector valve when the clutch is out, said latter connection being entirely independent of the first connection to the selector valve for supplying fluid pressure to those hydraulically operated shifting devices shifting the gears directly connecting to the spindle for positively moving the same out of mesh.

12. In a lathe, a bed, a headstock, a spindle, a spindle driving transmission, a carriage, a hydraulic apparatus for shifting the gears of the transmission, including, a selector valve for said apparatus, a manually operable dial means on the headstock for operating said selector valve, a manually operable dial means on the carriage connected to said valve for operating the same, said connection including a shaft extending along and mounted on the lathe bed, a gear journalled in said carriage and in splined connection on said shaft and a second gear mounted on said carriage and meshing with the first gear, said second gear connected to said dial means on the carriage.

13. In a hydraulic gear shifting apparatus, a speed change transmission, a clutch for said transmission, a fluid pressure development means, a selector valve, fluid connection from said selector valve to said fluid pressure development means, shifting devices for the respective shiftable gears of the transmission, fluid connections between the selector valve and the shifting devices, a main control valve in the fluid connection between the fluid pressure development means and the selector valve, a cam mounted on the clutch shifting rod engaging the plunger of the main control valve for operating the same, said cam having an intermediate portion formed to place the control valve in position for cutting off the fluid pressure supply to the selector valve when the clutch is in neutral and formed at each side of the intermediate portion to connect the fluid pressure supply to the selector valve immediately upon movement of the clutch lever in either direction whereby actuation of the respective shifting devices takes place prior to the completion of clutch lever movement and full power connection.

14. In a hydraulic gear shifting apparatus, a spindle, a spindle driving transmission, a clutch for said transmission, a clutch shifting rod, a fluid pressure development means, a selector valve, fluid connection from said selector valve to said fluid pressure development means, shifting devices for the respective shiftable gears of the transmission, fluid connections between the selector valve and the shifting devices, a main control valve in the fluid connection between the fluid pressure development means and the selector valve, means mounted on the clutch shifting rod engaging the plunger of the main control valve for operating the same, said means adapted to place the control valve in position for cutting off the fluid pressure supply to the selector valve when the clutch is in neutral and adapted to connect the fluid pressure supply to the selector valve immediately upon movement of the clutch lever in either direction whereby actuation of the respective shifting devices takes place prior to the completion of clutch lever movement to full power connection.

WILLIAM G. HOELSCHER.
GEORGE E. HIEBER.
ALBERT E. ROBINSON.